No. 633,231. Patented Sept. 19, 1899.
M. N. COLLINS.
VEHICLE BRAKE.
(Application filed June 1, 1898.)
(No Model.)
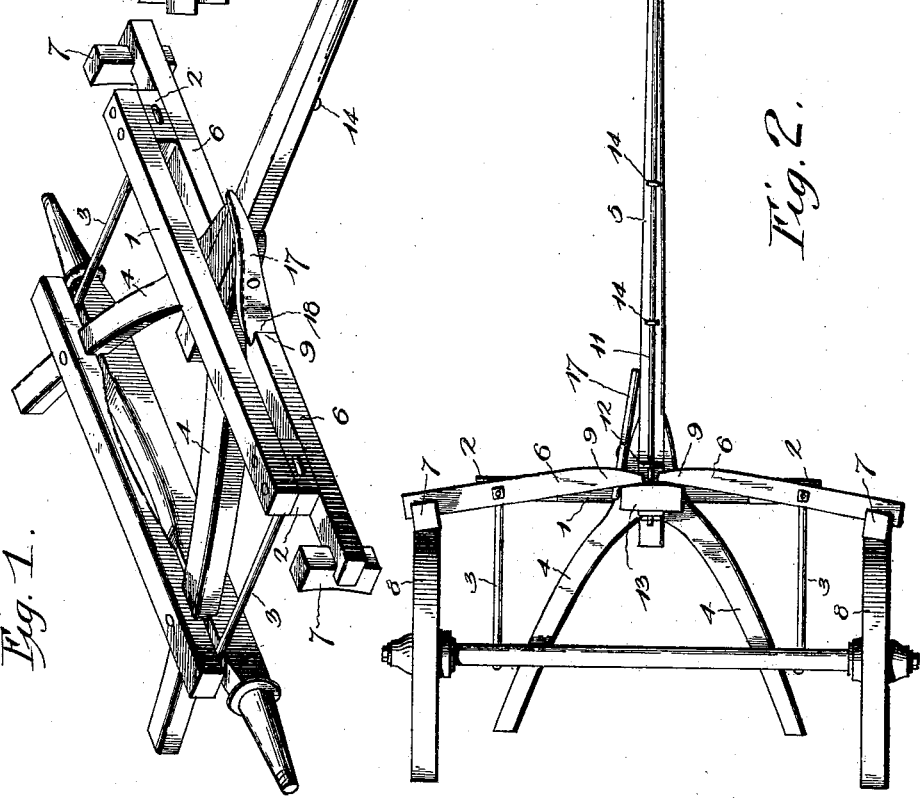
Witnesses
J. Grant Culverwell.
J. J. F. Riley
Marion N. Collins, Inventor.
By his Attorneys,
C. A. Snow & Co.
THE NORRIS PETERS CO., PHOTO-LITHO., WASHINGTON, D. C.

UNITED STATES PATENT OFFICE.

MARION N. COLLINS, OF ACKERMAN, MISSISSIPPI.

VEHICLE-BRAKE.

SPECIFICATION forming part of Letters Patent No. 633,231, dated September 19, 1899.

Application filed June 1, 1898. Serial No. 682,235. (No model.)

*To all whom it may concern:*

Be it known that I, MARION N. COLLINS, a citizen of the United States, residing at Ackerman, in the county of Choctaw and State of Mississippi, have invented a new and useful Vehicle-Brake, of which the following is a specification.

The invention relates to improvements in vehicle-brakes.

The object of the present invention is to improve the construction of vehicle-brakes and to provide a simple and comparatively inexpensive one adapted to be automatically applied by the forward movement of a vehicle on the draft-animals in descending an incline, thereby enabling both hands of the driver to be employed in controlling the team.

A further object of the invention is to provide a brake of this character adapted to operate directly on the front wheels of a vehicle and capable of being locked out of operation when it is desired to back the vehicle.

The invention consists in the construction and novel combination and arrangement of parts hereinafter fully described, illustrated in the accompanying drawings, and pointed out in the claim hereto appended.

In the drawings, Figure 1 is a perspective view of a portion of a running-gear provided with an automatic brake constructed in accordance with this invention. Fig. 2 is a reverse plan view of the same. Fig. 3 is a transverse sectional view.

Like numerals of reference designate corresponding parts in all the figures of the drawings.

1 designates a transverse bar or beam centrally secured to the upper faces of the front hounds adjacent to the rear end of the tongue and extending from opposite sides thereof, and secured to the lower face of the transverse bar or beam at the end thereof are spacing-blocks 2, which are connected with the front axle by longitudinal bracing-rods 3, that strengthen and support the construction. The lower faces of the spacing-blocks 2 are located in the same plane as the lower faces of the hounds 4 and tongue 5, and they have fulcrumed on them transverse brake-levers 6, which carry brake-shoes 7 at their outer ends for engaging the front wheels 8. The inner ends 9 of the brake-levers are beveled and guided on the lower faces of the tongue and its front hounds, and the inner arms of the levers are longer than the outer arms, and the pivot or fulcrum points may be arranged at any desired point to obtain the necessary leverage. The inner ends 9 of the brake-levers are contiguous to each other when in direct alinement and are provided with notches 10, through which pass a connecting-rod 11, which is provided in front and in rear of the brake-levers with laterally-disposed projections or arms 12 and 13, arranged to engage the brake-levers, whereby the same will be oscillated when the connecting-rod is reciprocated. The rear arms or projections 13, which engage the rear faces of the brake-levers, are rounded at their front faces, as clearly shown in Fig. 2 of the accompanying drawings, and they may be formed by a removable block suitably secured to the rear end of the connecting-rod. These projections or arms 13, which engage the brake-levers during the application of the brake, are much stronger than the front arms or lugs 12, which throw the brake-shoes off the wheels. The connecting-rod, which extends forward from the inner ends of the brake-levers, is arranged in suitable guides 14, and its front end is connected with the lower end of a substantially vertical lever 15. The lever 15, which is fulcrumed on an arm 16, is provided at its lower end with an eye, which is linked into an eye of the front end of the connecting-rod, and the upper end of the lever is designed to be connected with the neck-yoke, whereby when there is a backward strain on the same, incident to the forward movement of the vehicle on the draft-animal, the upper arm of the lever will be swung rearward and carry the brake-shoes into engagement with the front wheel. The arm 16 extends forward from and forms a prolongation of the tongue and is bifurcated to receive the lever 15, which is fulcrumed at a point between its center and its lower end, and the pivot or fulcrum may be arranged at any desired point to obtain the necessary leverage.

In order to lock the automatic brake out of operation when it is desired to back the vehicle, a lever 17 is provided and is fulcrumed at a point between its ends on the outer side of one of the hounds 4, as clearly shown in Fig. 1 of the accompanying drawings. The upper portion of the lever 17 forms a handle, and the lower portion is enlarged and is provided with a notch 18, adapted to engage the upper and front face of the inner portion of one of the brake-levers, whereby the same is locked against forward movement.

The invention has the following advantages: The brake, which is purely automatic in its operation, is direct in its action and engages the front wheels of a vehicle and it leaves the hands of the driver free to control the draft-animals. When the vehicle moves forward on the draft-animals in descending a hill or other incline, the brake is automatically applied, and the brake-levers may be locked out of operation when it is desired to back the vehicle.

Changes in the form, proportion, and minor details of construction may be resorted to without departing from the spirit or sacrificing any of the advantages of the invention.

What I claim is—

The combination with a running-gear, of a transverse brake-beam mounted on the upper face of the tongue and provided at the lower faces of its ends with spacing-blocks, bracing-rods extending from the spacing-blocks to the front axle, the transversely-disposed brace-levers fulcrumed between their ends on the spacing-blocks and having their inner ends arranged contiguous to each other and grooved to form an opening or passage, a reciprocating rod passing through the opening or passage and disposed longitudinally of the tongue, a stop mounted on the rod and located in advance of the inner ends of the levers to move the same rearward, a block mounted on the rod in rear of the levers, a fastening device detachably securing the block to the rod, and means for operating the brake-levers and for locking them out of operation, substantially as described.

In testimony that I claim the foregoing as my own I have hereto affixed my signature in the presence of two witnesses.

MARION N. COLLINS.

Witnesses:
BEN F. TOLER,
B. W. RUNNELS.